Dec. 3, 1935. H. K. JETT ET AL 2,022,886
RUMBLE SEAT LOCK
Filed May 22, 1934
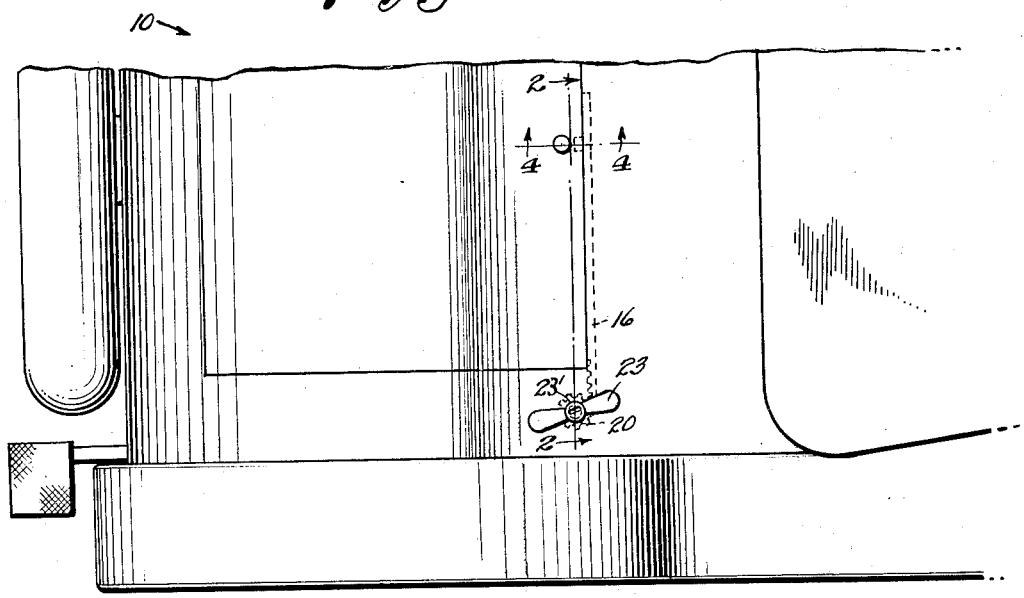
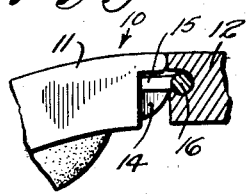
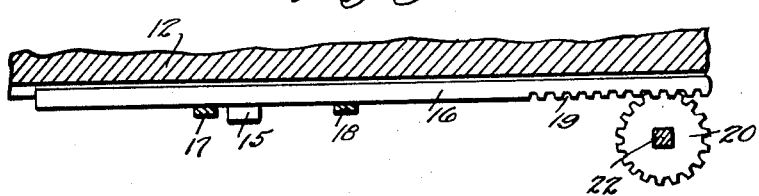
Inventors
Hamer K. Jett &
Howard L. Showalter
By Miller + Miller
Attorneys Patented Dec. 3, 1935

2,022,886

UNITED STATES PATENT OFFICE 2,022,886

RUMBLE SEAT LOCK

Hamer K. Jett and Howard L. Showalter, Brooksville, Ky.

Application May 22, 1934, Serial No. 726,976

4 Claims. (Cl. 70—14)

This invention relates to a rumble seat lock and has for an object to provide a means for locking and unlocking the seat back of a rumble seat from a convenient position adjacent the side of the automobile in which the rumble seat is located.

In the usual rumble seat back a lock or latching means is generally provided in the center of the rumble seat back generally near the forward side or edge of the back and opens up. In order to reach and operate the conventional lock on the rumble seat back, it is necessary to balance precariously on the rumble seat step located on the fender or bumper, and reach over the back of the car to insert the key and operate the latch. Beside the inconvenience and danger of such an operation in that the operator might slip while bending in this awkward position, there is always the possibility of soiling one's clothing against the fender, bumper or other part of the automobile. In this invention, while the latching of the rumble seat back takes place in the usual central position, the means for operating the latching means is located at the side of the car preferably at the right hand side, so that the operator may easily reach the same and lock or unlock the seat without standing on the rumble seat step and leaning over the fender.

This distantly controlled rumble seat lock may be easily and inexpensively installed in existing rumble seats, but of course would preferably be installed as factory equipment, eliminating the necessity for changing over a conventional construction.

With the foregoing and other objects in view, as will hereinafter become apparent, this invention comprises the constructions, combinations and arrangements of parts, hereinafter set forth, disclosed and shown on the accompanying drawing. In this drawing, Figure 1 is a plan view of the invention as applied to a rumble seat and rumble seat back, Figure 2 is a sectional view taken on the line 2—2 of Figure 1, Figure 3 is a sectional view taken on the line 3—3 of Figure 2, and Figure 4 is a sectional view taken on the line 4—4 of Figure 1.

There is shown at 10 an automobile of the type having a rumble seat installed in the back thereof. The rumble seat back 11 may be opened from the closed to the open position in any convenient manner and when in closed position abuts against the front 12 of the rumble seat and is held in closed position by a re-pressible latch bolt 14 which in closed position projects below the catch 15 holding the rumble seat back 11 in closed position.

In the conventional rumble seat lock the catch 15 would be fixed in position and means would be provided projecting through the center of the rumble seat back for retracting a retractable latch bolt, but in this invention the retractable latch bolt 14 is held in the latching position by means of a spring concealed within the seat back 11. The catch 15 instead of being fixed to the front of the rumble seat is mounted on a movable bar 16 extending transversely across the front of the rumble seat.

This movable bar 16 is secured to the front of the rumble seat 12 by means of a pair of clamps 17 and 18, catch 15 being located between the clamps 17 and 18. By moving the bar 16 back and forth within the limit of its movement, the catch 15 may be brought into the path of the latch bolt 14, or removed from the path thereof. When it is removed from the path of the latch bolt 14 it will be no longer between the latch bolt 14 and the top edge of the seat back 11, thereby allowing the seat back 11 to be pivoted to the upright position in any convenient manner. When the bar 16 is removed to the opposite end of its path of movement, the catch 15 will be then placed in the path of movement of the latch bolt 14 as the seat back 11 is moved to closed position. If the catch 15 is placed in the locking position while the seat back 11 is open the latch bolt 14 merely retracts itself against its compression spring as the seat is being closed, and then snaps under the catch 15 thereby locking the seat back 11 until the catch 15 is moved transversely thereof to allow the seat back to be reopened.

The bar 16 extends preferably to the right side of the rumble seat and at its ends forms into a rack 19. This rack 19 cooperates with the teeth of a cogwheel 20, the cogwheel 20 being held in proper cooperative position by means of a flanged plate 21 extending from the front of the rumble seat 12, the plate 21 likewise serving as guide means for the rack end 19 of the bar 16. The cogwheel 20 has a square opening therein adapted to cooperate with the square stem 22 of the latch handle 23. This latch handle 23 is provided with a conventional cylinder lock 23' for operation by a cylinder lock key 24 so that the latch handle 23 when in unlocked position may rotate to operate the square stem 22 and thereby rotate the cogwheel 20, and when in locked position it is impossible to rotate the square stem 22, the cylinder lock therein being either of the type that locks the handle portion against movement or may allow the handle portion to spin freely on the stem portion without any connection thereto when in locked position.

To place the rumble seat back in locked position, it is only necessary to rotate the handle latch 23 and cause the bar 16 to carry the catch 15 into the path of movement of the latch bolt 14 and between the latch bolt 14 and the edge of the rumble seat back 11. The key 24 is then inserted and operated to lock the square stem 22 against movement, thus causing the catch 15 to remain in locked position, and once the seat back has been placed in closed position, the latch bolt 14 will catch against the catch 15 and hold it in locked position.

To open the seat back, the square stem 22 of the latch handle 23 is rotated in reverse direction, withdrawing the rack 19 and bar 16 so as to withdraw the catch 15 from over the latch bolt 14, allowing the seat back 11 to be raised in any conventional manner.

The novel features and the operation of this device will be apparent from the foregoing description. While the device has been shown and the structure described in detail, it is obvious that this is not to be considered limited to the exact form disclosed, and that changes may be made therein within the scope of what is claimed, without departing from the spirit of the invention.

Having thus set forth and disclosed the nature of this invention, what is claimed is:

1. Means for use in locking and unlocking a rumble seat back from one side thereof, said means including a latch bolt at the center of the rumble seat back, a catch member for said latch bolt, means extending to one side of the rumble seat back for operating said catch member transversely of said latch bolt, said operating means including a transverse bar on which said catch member is mounted, a rack member on one end of said transverse bar, a cogwheel in mesh with said rack member, and a latch handle for rotating said cogwheel to transversely move said catch bar, said latch handle including lock means permitting or preventing operation thereof.

2. Means for use in locking and unlocking a rumble seat back from one side thereof, said means including a latch bolt at the center of the rumble seat back, a catch member for said latch bolt, means extending to one side of the rumble seat back for operating said catch member transversely of said latch bolt, said operating means including a transverse bar on which said catch member is mounted, a rack member on one end of said transverse bar, a cogwheel in mesh with said rack member, and a latch handle for rotating said cogwheel to transversely move said catch bar, said latch handle including lock means permitting or preventing operation thereof, said latch handle being located at a side of the rumble seat back.

3. For use in locking and unlocking a rumble seat back in closed position from one side thereof; a re-pressible latch bolt on said rumble seat, a catch member cooperable with said re-pressible latch bolt, mounting means for said catch member, means for supporting said catch member mounting means for transverse movement, means for transversely operating said mounting means forwardly to locking position or rearwardly to unlocking position, said transverse operating means including a rack member formed on the end of said mounting means, a cogwheel in mesh with said rack member, and a lockable latch handle for rotating said cogwheel.

4. For use in locking a rumble seat back in closed position from one side thereof; a re-pressible latch bolt on said rumble seat, a catch member cooperable with said re-pressible latch bolt, mounting means for said catch member, means for supporting said catch member mounting means for transverse movement, means for transversely operating said mounting means, said transverse operating means including a rack member formed on the end of said mounting means, a cogwheel in mesh with said rack member, a latch handle for rotating said cogwheel, and means for locking said latch handle.

HAMER K. JETT.
HOWARD L. SHOWALTER.